(No Model.)
P. HENRY.
WATCH CASE PENDANT.
No. 378,959. Patented Mar. 6, 1888.
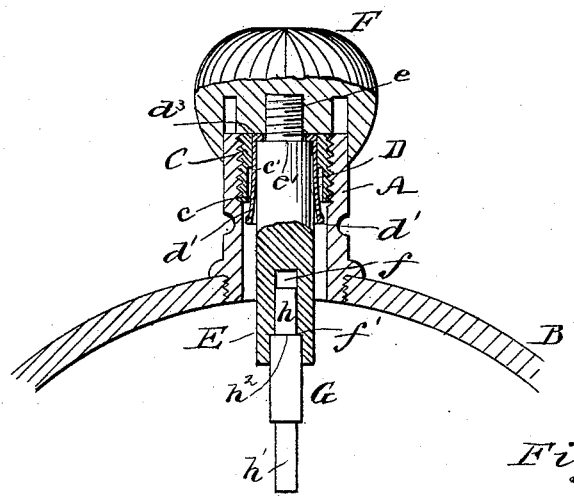
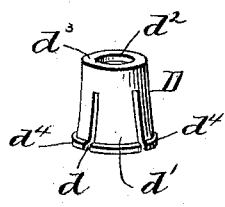
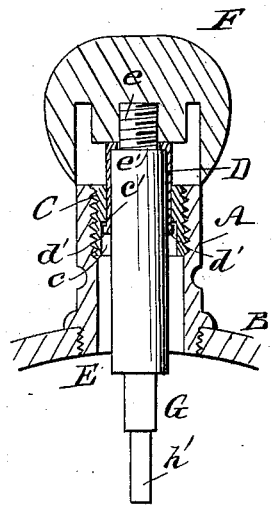
WITNESSES:
INVENTOR:
P. Henry
BY Munn & Co
ATTORNEYS.

UNITED STATES PATENT OFFICE.

PETER HENRY, OF NEW YORK, N. Y.

WATCH-CASE PENDANT.

SPECIFICATION forming part of Letters Patent No. 378,959, dated March 6, 1888.

Application filed November 10, 1887. Serial No. 254,772. (No model.)

*To all whom it may concern:*

Be it known that I, PETER HENRY, of the city, county, and State of New York, have invented a new and Improved Key for Stem-Winding Watches, of which the following is a full, clear, and exact description.

The object of my invention is to provide a key for stem-winding watches, which may be used with equal facility with any "stem set" movement, and also with any "lever-set" movement; and the invention consists, principally, of a bar formed at each end with a winding-shank, said shanks being of unequal lengths and said bar being adapted to be reversed in the rotating stem or holder.

The invention also consists of the construction, arrangement, and combination of parts, all as hereinafter described and claimed.

Reference is to be had to the accompanying drawings, forming a part of this specification, in which similar letters of reference indicate corresponding parts in all the figures.

Figure 1 is a sectional elevation of a part of a watch-case, the pendant, and my new stem-winding mechanism. Fig. 2 is a similar view showing the winding-stem raised to position for setting the hands. Fig. 3 is a perspective view of the retaining-spring.

Within the pendant A of the watch-case B is screwed the short sleeve C, enlarged upon the inside at the lower end, at $c$, forming the offset or shoulder $c'$. Within the sleeve C is placed the retaining-spring D, in the form of a thimble, slotted at $d$ to form the spring tongues or sections $d'$. The upper end of the said spring-thimble is formed with an orifice, $d^2$, for the screw-threaded shank $e$ of the stem or holder E. The orifice $d^2$ is of such size as to form the shoulder $d^3$, which rests upon an offset, $e'$, of the stem E, so that the crown F, when screwed upon the shank $e$, will bind the thimble D securely in place, as will be understood from Fig. 1. The lower edge of each of the spring-sections $d'$ is formed with a flange, $d^4$, which act as stops against the offset or shoulder $c'$ of the sleeve C, to limit the outward movement of the stem E and crown F when the same is drawn out to the position shown in Fig. 2. The stem E is formed with a square longitudinal recess, $f$, to receive the winding-bar G. This bar G is formed with the shanks $h$ $h'$, one at each end, the shank $h'$ being somewhat longer than the shank $h$, to be used for stem-set winding movements, while the short shank $h$ is for lever-set movements. The said winding-bar is reversible in the recess $f$, so that either end of the bar may be used, as desired, and the bar is formed with a shoulder, $h^2$, to strike against the offset $f'$ in the recess $f$, to limit the distance of insertion of the shank $h$. The shank $h'$ when inserted is limited by the depth of the recess itself.

Having thus described my invention, what I claim as new, and desire to secure by Letters Patent, is—

1. The winding-bar G, formed with a shank at each end, in combination with the holder E, formed with a recess to receive either end of the winding-bar, substantially as described.

2. The pendant A, provided with the screw-threaded sleeve C, enlarged at $c$, in combination with the spring D and stem or holder E, the spring being secured to the said stem or holder, substantially as described.

3. The stem or holder E, formed with screw-shank $e$ and shoulder $e'$, and the sleeve C, screwed into the pendant and enlarged to form the shoulder $c'$, in combination with the burr F and cup-shaped spring D, held upon the shoulder $c'$ by the burr, substantially as described.

4. As a new article of manufacture, the spring D, having the orifice $d^2$ and made cup-shaped, with converging sides, slotted at $d$ to form spring tongues or sections $d'$, having flanges $d^4$ at their edges, the sections or tongues $d'$ being curved from the top of the slots outward, substantially as described.

PETER HENRY.

Witnesses:
H. A. WEST,
C. SEDGWICK.